United States Patent [19]

Yamaguchi

[11] 3,913,928

[45] Oct. 21, 1975

[54] RESILIENT JOINT

[76] Inventor: Seiichi Yamaguchi, 11-2 Asagaya Minami 1-chome, Suginami, Tokyo, Japan

[22] Filed: Sept. 19, 1973

[21] Appl. No.: 398,786

[30] Foreign Application Priority Data
Apr. 30, 1973 Japan.............................. 48-50829
Aug. 13, 1973 Japan.............................. 48-90062

[52] U.S. Cl.......... 277/209; 277/DIG. 2; 277/212 F
[51] Int. Cl.².......................... F16J 9/00; F16L 19/00
[58] Field of Search .......... 277/209, DIG. 2, 11, 32, 277/212 F, 207

[56] References Cited
UNITED STATES PATENTS
3,386,745  6/1968  Hein .............................. 277/DIG. 2
3,702,193  11/1972  Flegel et al. ........................ 277/209

FOREIGN PATENTS OR APPLICATIONS
247,518  12/1947  Switzerland..................... 277/DIG. 2
1,083,451  9/1967  United Kingdom............ 277/DIG. 2
1,432,209  2/1966  France ........................... 277/DIG. 2

Primary Examiner—Samuel B. Rothberg
Attorney, Agent, or Firm—Oblon, Fisher, Spivak, McClelland & Maier

[57] ABSTRACT

A resilient joint for connecting pipes together in a fluid-tight relationship which comprises an integral hollow cylindrical body having a center opening for receiving one of the pipes, an outwardly and radially extending flange at the upper end of the body, a plurality of vertically spaced resiliently deformable annular fins of triangular cross-section formed on the inner surface of the body for receiving the outer surface of the one pipe in fluid-tight relationship, a plurality of vertically spaced resiliently deformable annular fins of triangular cross section formed on the outer surface of the body for receiving the inner surface of the other pipe in fluid-tight relation, and a hollow cylindrical skirt extending downwardly and being resiliently deformable inwardly or outwardly for accommodating pipes having different diameters.

2 Claims, 8 Drawing Figures

RESILIENT JOINT

BACKGROUND OF THE INVENTION

This invention relates to resilient joints for use in connecting pipes in the piping system for wash basins, bath tubs, close-stools and the like facilities and more particularly, to resilient joints for fluid-tightly connecting pipes in the piping system for wash basins, bath tubs, close-stools and the like facilities in such a manner that even when the connected pipes are subjected to shock which may otherwise disconnect the pipes from each other, the resilient joints themselves flex to absorb such shock whereby the pipes can be maintained in their fluid-tightly connected condition.

In the construction of water-supply and drainage facilities such as installation of pipings for wash basins, bath tubs, close-stools and the like, the pipes are connected together by inserting a stiff joint pipe into one of the opposite ends of the pipes to be connected together and applying adhesive or adhesive tape to the connections so as to form fluid-tight seals in the connections.

However, wash basins, bath tubs and close-stools are generally installed at areas in buildings where installation work for connecting pipes in the piping of such facilities are difficult to perform and the connection operation requires a great deal of time and skilled hand. In addition, since most wash basins, bath tubs and close-stools are formed of ceramics, they are often insufficiently sealed and water leakage frequently occurs in the connections between such facilities and their associated drain pipes. Whenever the leaking connections are to be repaired, the floor adjacent to the wash basins, bath tubs and close-stools has to be removed and after the repair, the floor is reinstated requiring troublesome operation.

Water leakage in the drain piping for wash basins, bath tubs and close-stools where a vast volume of water is always flowing through or at least some water is always standing is not desirable from the sanitary point of view. Therefore, connection joints for use in the drain piping for wash basins, bath tubs and close-stools which connect pipes in such a drain piping in a brief time against water leakage without requiring any skilled labor have been longed for.

There have been proposed a great variety of connection joints for use in connecting pipes in the piping system for wash basins, bath tubs and close-stools and one type of the prior art connection joints for such purpose comprises a joint pipe for connecting a riser which extends from a base pipe under the floor or a branch pipe connected to the riser to the discharge port of the wash basin, bath tub or close-stool. However, the connection operation by the employment of such a prior art joint pipe requires welding in the connections between the connected members and is inconvenient because such operation has to be effected under the floor. Furthermore, when the piping system including pipes connected by such a prior art joint pipe is subjected to shock, such as abnormal vibration or earthquake, a crack or cracks develop in the connection and/or some damage occurs in one or both of the connected pipes, leading to water leakage. Especially, if the floor where the piping system is installed is made of concrete, it is not easy to repair such damages.

Since most prior art joint pipes are made of metal, the connection operation employing such metal joint pipes requires a great deal of time and the joint pipes become rusty after a brief time of service, also leading to water leakage.

SUMMARY OF THE INVENTION

Therefore, one principal object of the present invention is to provide a novel and improved resilient joint which can effectively eliminate the disadvantages inherent in the prior art joint pipes for use in connecting pipes in the piping system associated with wash basins, bath tubs and close-stools.

Another object of the present invention is to provide a resilient joint for use in the piping system associated with water-supply and drainage systems which can connect pipes in such a piping system in a simple manner, prevent water leakage in the connections and minimize occurrence of damage in the connections and/or pipes themselves even when subjected to shock such as abnormal vibration or earthquake, thereby to ensure a long service life to the piping system.

Another object of the present invention is to provide a resilient joint formed of natural or synthetic rubber or resilient plastic material for connecting pipes in a piping system against water leakage in the connections between the pipes.

Another object of the present invention is to provide a resilient joint for connecting pipes in the drain pipe system associated with a wash basin, bath tub, close-stool and the like facility which connects the pipes together in a quite simple manner.

Another object of the present invention is to provide a resilient joint comprising a hollow cylindrical body provided on the inner and outer surfaces with a plurality of fins for sealingly receiving pipes to be connected thereby in the interior and on the exterior of the joint against inadvertent disconnection of the pipes from each other.

Another object of the present invention is to provide a resilient joint comprising a hollow cylindrical body which is integrally formed with a skirt or extension which can be sheared off the body as desired or necessary for more positive connection between pipes.

Another object of the present invention is to provide a resilient joint comprising a hollow cylindrical body which is integrally formed with a skirt or extension which can be folded back for accommodating pipes having different diameters.

Another object of the present invention is to provide a resilient joint comprising a hollow cylindrical body which is integrally formed with an outwardly and radially extending flange against which one end of one of pipes to be connected is adapted to abut and with an inwardly and radially extending flange against which one end of the other pipe is adapted to abut thereby to sealingly connect the pipes together against water leakage.

Another object of the present invention is to provide a resilient joint for use in connecting pipes in the drain piping system associated with a wash basin, bath tub or close-stool which, when subjected to shock such as abnormal vibration or earthquake, flexes to absorb the shock thereby to protect the connections and/or the pipes themselves against possible damage.

According to one embodiment of the present invention, the resilient joint comprises a hollow cylindrical body formed of natural or synthetic rubber or resilient plastic material and provided on the inner and outer surfaces with fins for fluid tightly receiving pipes to be connected together in the interior and on the exterior of the body and an integral hollow cylindrical skirt or extension which is foldable inwardly and outwardly. The pipe to be received in the interior of the body may be the discharge port of a wash basin, bath tub or close-stool, for example, and the pipe to be received on the exterior of the body may be a pipe of the drain piping system associated with the wash basin, bath tub or close-stool, for example, and embedded in concrete or ground. The piping system including the pipes connected together by the joint is protected against fluid leakage and possible damage due to shock such as abnormal vibration or earthquake. The pipes involved can be simply connected together by the inventive resilient joint and the thus connected pipes are protected against inadvertent disconnection.

BRIEF DESCRIPTION OF THE DRAWINGS

The above and other objects and attendant advantages of the present invention will be more readily apparent to those skilled in the art from a reading of the following detailed description in conjunction with the accompanying drawings which show preferred embodiments of the invention for illustration purpose only, but not for limiting the scope of the same in any way, wherein like reference numerals designate like or corresponding parts throughout the several views and in which.

DETAILED DESCRIPTION OF THE PREFERRED EMBODIMENTS

The present invention will be now described referring to the accompanying drawings and more particularly, to FIGS. 1 through 6 in which one preferred embodiment of the present invention is illustrated.

Figure 1:
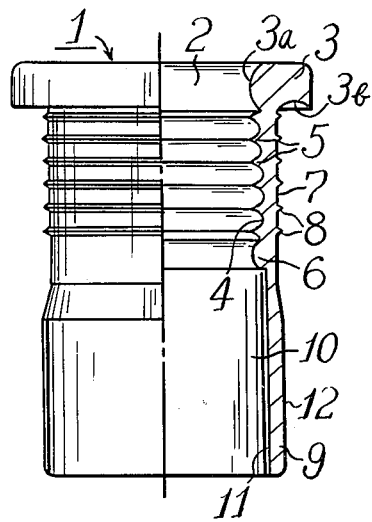
FIG. 1 is an elevational view, partially broken away, of one preferred embodiment of a resilient joint constructed in accordance with the present invention.

The preferred embodiment of a resilient joint of the invention comprises an integral hollow cylindrical body 1 which may be formed of natural or synthetic rubber or any other suitable plastic material having the resiliency required for attaining the purposes of the invention as referred to above and includes a longitudinal center opening 2. The body 1 further includes an outwardly and radially extending flange 3 surrounding the center opening 2 at the upper end of the latter. The flange 3 has a convexed annular inner surface 3a which has a semispherical configuration and extends inwardly of the vertical circle of the inner peripheral surface 4 of the body 1 by a small distance for the purpose to be described hereinafter. The inner surface 4 of the body 1 is formed with a plurality of vertically spaced annular fins 5 of a triangular configuration covering the distance from a point just below the annular inner surface 3a of the flange 3 to a second point below the first-mentioned point for cooperating the flange inner surface in a manner as will be described hereinafter and the free ends or apices of the fins lie substantially in the same vertical plane as the apex of the inner surface 3a of the flange 3. A semi-spherical annular projection 6 is formed on the inner surface 4 of the body 1 at a point just below the lowest one of the plural fins 4 for cooperating with the inner surface 3a of the flange 3 and the fins 5 in a manner as will be described hereinafter. For the purpose, the apex of the projection 6 also lies substantially in the same vertical circular plane as the flange inner surface 3a and the apices of the fins 5. The underside of the annular flange 3 is provided with an annular recess 3b for the purpose to be described hereinafter. The outer surface 7 of the body 1 is also formed with a plurality of vertically spaced annular fins 8 of a triangular configuration in opposition to the corresponding fins 5 on the body inner surface 4. The overall size of each of the fins 8 is formed somewhat smaller than that of each of the fins 5, as seen in FIG. 1. A hollow cylindrical skirt or extension 9 is integrally and coaxially formed with and extends downwardly of the body 1 and has a center longitudinal opening 10 extending therethrough. The center opening 10 in the extension 9 is in communication with the center opening 2 in the body 1 and has a diameter slightly larger than that of the center opening 2 in the body 1. The inner surface 11 of the extension 9 is smooth and has a uniform diameter throughout the height thereof and the outer surface 12 of the extension is also smooth, but not uniform in diameter. The larger diameter lower portion of the outer surface 12 of the extension 9 lies substantially in the same vertical circular plane as the apices of the fins 8. More particularly, the outer surface 12 of the extension 9 has a smaller diameter upper portion which has substantially the same diameter as that of the outer surface 7 of the body 1 and a lower larger diameter portion connected to the upper smaller diameter portion by an annular shoulder which smoothly increases its diameter from the upper portion toward the lower portion.

Figure 2:
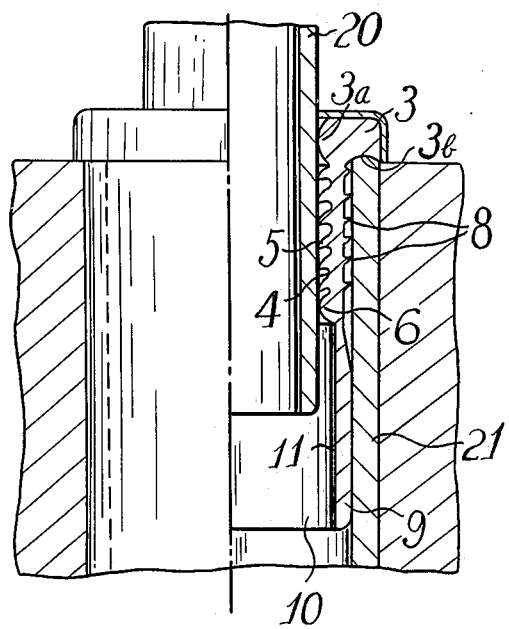
FIG. 2 is an elevational view, partially broken away, of the resilient joint of FIG. 1 as being applied for joining pipes together.

One application of the resilient joint of the invention having the above-mentioned construction will be now described referring to FIG. 2 of the accompanying drawings in which the joint is employed for connecting two pipes of different diameters together. A smaller diameter pipe 20 which has an outer diameter slightly larger than an imaginary circle defined by the apices of the flange inner surface 3a, the inner fins 5 and the projection 6 of body 1 is forcibly inserted into the center opening 2 and the body 1 until the lower end of the pipe 20 extends downwardly beyond the projection 6 by a distance.

With the pipe 20 received in the opening 2 of the body 1 in the manner mentioned just above, since the diameter of the pipe 20 is slightly larger than that of the imaginary circle defined by the apices of the flange inner surface 3a, the inner fins 5 and the projection 6, the flange inner surface and projection yield resiliently and the inner fins resiliently deform downwardly as seen in FIG. 2 whereby a fluid-tight seal is formed between the pipe and joint.

Thereafter, a second pipe 21, which has an inner diameter slightly larger than the outer diameter of the extension 9 and, more particularly, the diameter of an imaginary circle defined by the larger diameter lower portion of the extension and the apices of the outer fins 8, is slid along the outer surface of the extension 9 and outer fins 8 until the upper end of the pipe 21 abuts against the annular recess 3b in the flange 3. With the pipe 21 received on the extension and body of the joint in the manner mentioned just above, since the inner diameter of the pipe 21 is slightly larger than the diameter of the imaginary circle defined by the outer diameter of the extension larger diameter lower portion and the apices of the outer fins 8, the extension 9 yields resiliently and the outer fins 8 resiliently deform upwardly whereby a fluid-tight seal is formed between the second pipe and joint. Thus, it will be understood that the two pipes 20 and 21 are connected together in a sealed relationship with the resilient joint of the invention interposed therebetween and also against disengagement from each other. Although not shown in FIG. 2, in order to further assure the securement of the pipe 21 to the joint, the extension may be secured to the inner surface of the second pipe by means of any suitable adhesive.

Figure 3:
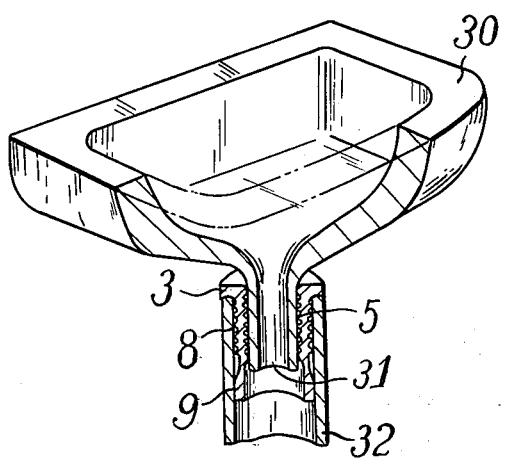
FIG. 3 is a perspective view in vertical-section of the resilient joint of FIG. 1 as being applied for connecting a wash basin, which is shown being partially broken away, and a piping associated with the basin together.

Referring to FIG. 3 of the accompanying drawings showing another application of the resilient joint of the invention, according to the embodiment illustrated in FIG. 1, in which the joint is employed for connecting between the discharge port of a water basin and a pipe of the associated drain piping system, the body 1 of the joint is sealingly fitted in the discharge port 31 of the water basin 30 and the drain pipe 15 is sealingly fitted on the body 1 whereby the discharge port and drain pipe are connected together in fluid-tight sealing relationship with the joint interposed therebetween in the same way as shown in FIG. 2.

Figure 4:
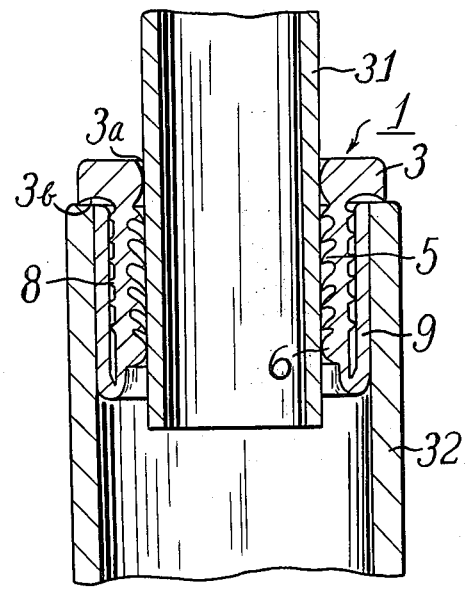
FIG. 4 is a vertically sectional view of the resilient joint of FIG. 1 showing the joint in a different deformed condition.

In the application shown in FIG. 3, if the drain pipe 32 has a larger diameter than that of the corresponding drain pipe of FIG. 3, as shown in FIG. 4, the skirt or extension 9 of the joint may be folded back outwardly so that the skirt will contact the outer fin 8 to accommodate the difference in diameter. Thus, the wall thickness of the body 1 is increased by the thickness of the skirt 9 so that the larger diameter drain pipe 32 can be also sealingly connected to the discharge port 31 by means of the joint having the increased wall thickness.

Figure 5:
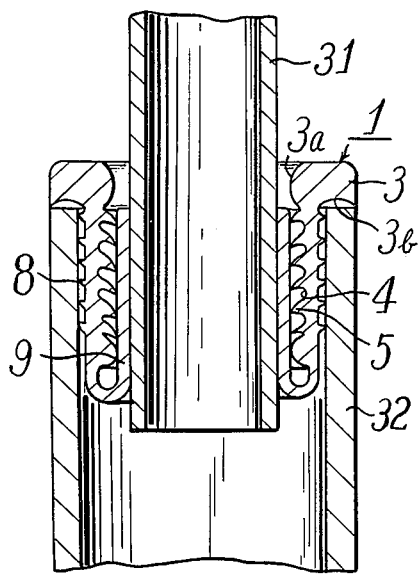
FIG. 5 is a vertically sectional view of the a resilient joint showing the joint in a further different deformed condition.

On the contrary, if the discharge port 31 has a diameter smaller than that of the corresponding port of FIG. 3, the skirt or extension 9 may be folded back inwardly so that the skirt will contact the inner fins 5, as shown in FIG. 5, to accommodate the difference in diameter whereby the increased wall thickness of the body 1 can compensate for the decrease in the diameter of the discharge port 31. In this way, the discharge port 31 can be also sealingly connected to the joint.

Figure 6:
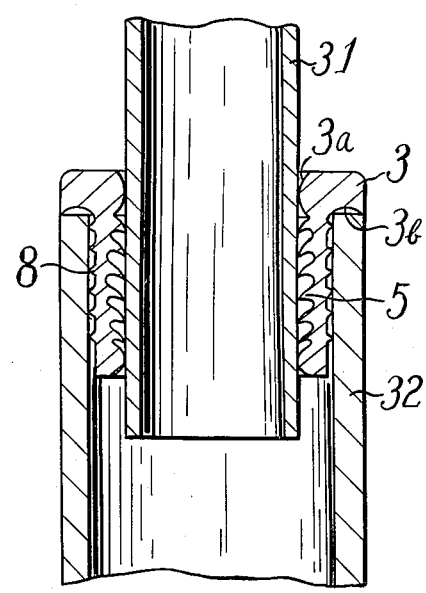
FIG. 6 is a view similar to FIG. 5, but shows the joint with its plain skirt or extension removed therefrom.

Furthermore, if necessary or desired, the skirt or extension 9 may be removed by cutting off the same, for example as shown in FIG. 6. Even when the skirt 9 has been removed, the joint can still sealingly connect between the discharge port 31 and drain pipe 32 provided that the upper end of the drain pipe abuts against the annular recess 3b in the flange 3.

Figure 7:
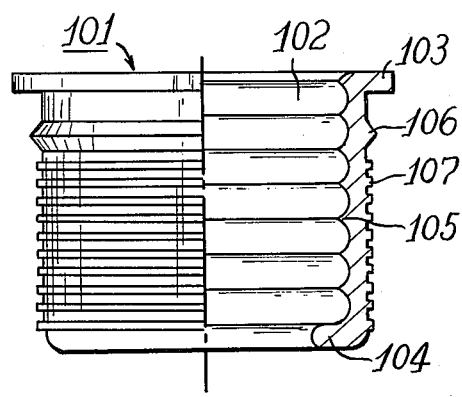
FIG. 7 is an elevational view, partially broken away, of a second embodiment of resilient joint constructed in accordance with the present invention.
Figure 8:
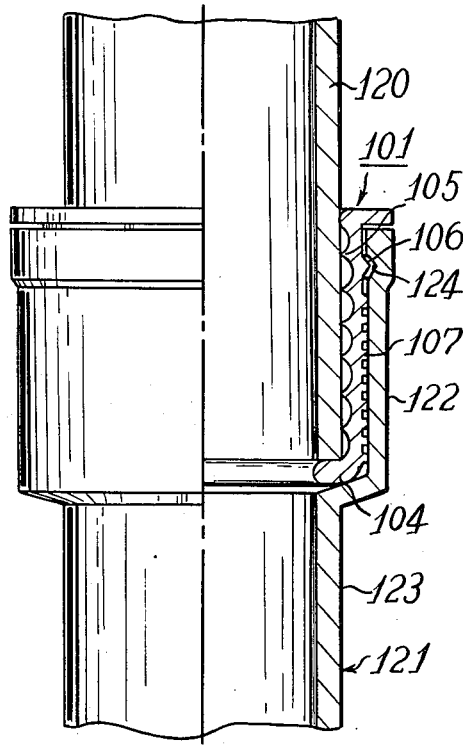
FIG. 8 is an elevational view, partially broken away, of the resilient joint of FIG. 7 showing the joint as being applied for joining pipes together.

FIGS. 7 and 8 show a second embodiment of a resilient joint of the invention and the joint comprises an integral hollow cylindrical body 101 having a longitudinal center opening 102. The body 101 is also formed of natural or synthetic rubber or any other resilient plastic material. The body 101 is also formed with an outwardly and radially extending flange 103 surrounding the center opening 102 at the upper end thereof and an inwardly and radially extending annular flange 104 surrounding the lower end of the center opening 102. The inner surface of the body 101 is provided with a plurality of vertically spaced fins 105 of a triangular configuration throughout the height of the body. The outer surface of the body 101 is formed with an annular projection 106 at a point spaced below the flange 103 for the purpose to be described hereinafter. The outer surface of the body 101 is also formed with a plurality of vertically spaced fins 107 beginning at a point below the projection 106 and ending at a point just above the bottom flange 104. A pipe 120 is inserted into the center opening 102 of the body 101 until the lower end of the pipe abuts against the inner surface of the bottom flane 104 in sealing contact with the inner fins 105 so as to form a fluid-tight seal between the joint and pipe as in the case of the foregoing embodiment. A second pipe 121 to be fitted on the body 101 has an enlarged diameter upper portion 122 and a reduced diameter lower portion 123 connected to the upper portion by a shoulder. The inner surface of the upper portion 122 of the second pipe 121 is formed with a triangular recess 124. The second pipe 121 is fitted in sealing contact with the outer fins 107 on the body 101 until the upper end of the pipe abuts against the underside of the flange 103 whereupon the recess 124 snaps on the mating projection 106 and at the same time, the inner surface of the shoulder abuts against the underside of the bottom flange 104 whereby the two pipes are sealingly connected together with the joint interposed therebetween as in the foregoing embodiment and at the same time, the second pipe 121 is prevented from inadvertently falling down by the cooperating projection 106 and recess 124.

As is clear from the foregoing description, according to the present invention, by the provision of the annular fins on both the inner and outer surfaces of the joint body, pipes to be connected thereby can be positively connected in fluid tight relationship and the fluid tight sealing is further enhanced by the provision of the skirt or extension. Furthermore, since the entire joint is formed of resilient material such as natural or synthetic rubber or any suitable resilient plastic material, even if the thus connected pipes are subjected to shock, such as abnormal vibration or earthquake, only the joint flexes and absorbs such shock to protect the pipes against any possible damage from such shock, thereby to assure a long service life.

Furthermore, when pipes are desired to be connected together by the joint of the invention, it is only necessary to insert one of the pipes into the opening of the joint and fit the other pipe on the joint pipe. Thus, the assembly operation can be easily effected without requiring any skilled labor. The assembly operation can be effected at less expense, and since the skirt or extension may be eliminated, as desired or necessary, or may be folded back inwardly or outwardly pipes having a wide range of different diameters can be connected together by a single size of joint.

The above detailed description of preferred embodiments of the invention is provided by way of example only. Various details of design and construction may be modified without departing from the true spirit and scope of the invention as set forth in the appended claims.

What is claimed is:

1. A resilient joint for connecting pipes together in a fluid-type relationship comprising an integral hollow cylindrical body formed of natural or synthetic rubber or resilient plastic material and having a longitudinally extending center opening, an outwardly and radially extending flange surrounding said opening at one end thereof, a plurality of vertically spaced resiliently deformable annular fins formed on the inner and outer surfaces of said body, said flange having a greater radial extension than said deformable annular fins on the outer surface of said body, and a hollow cylindrical skirt extending from the other end of said body and being resiliently foldable inwardly into the center opening of said body so that the inner surface of the skirt contacts the annular fins on the inner surface of said body and outwardly about the body so that the outer surface of the skirt contacts the annular fins on the outer surface of said body, whereby the effective thickness of the wall of the body can be selectively increased radially inwardly and outwardly thereof, said skirt having a portion the diameter of which is larger than that of said body and a wall thickness smaller than that of said body.

2. A resilient joint according to claim 1, wherein said annular fins have a triangular cross-section.

* * * * *